Dec. 12, 1944.    C. Z. MONROE    2,364,868
ARTICLE HANDLING MECHANISM
Filed Dec. 22, 1941    3 Sheets-Sheet 3
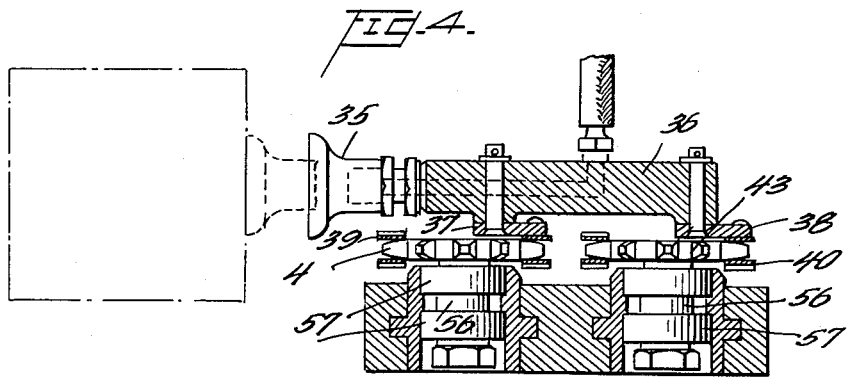
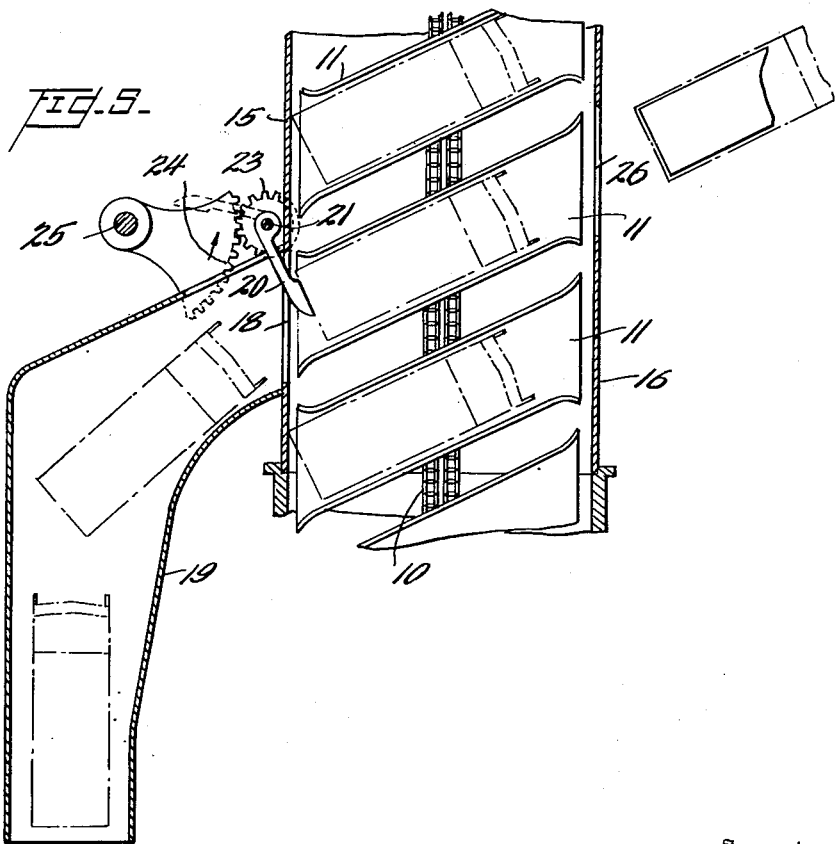

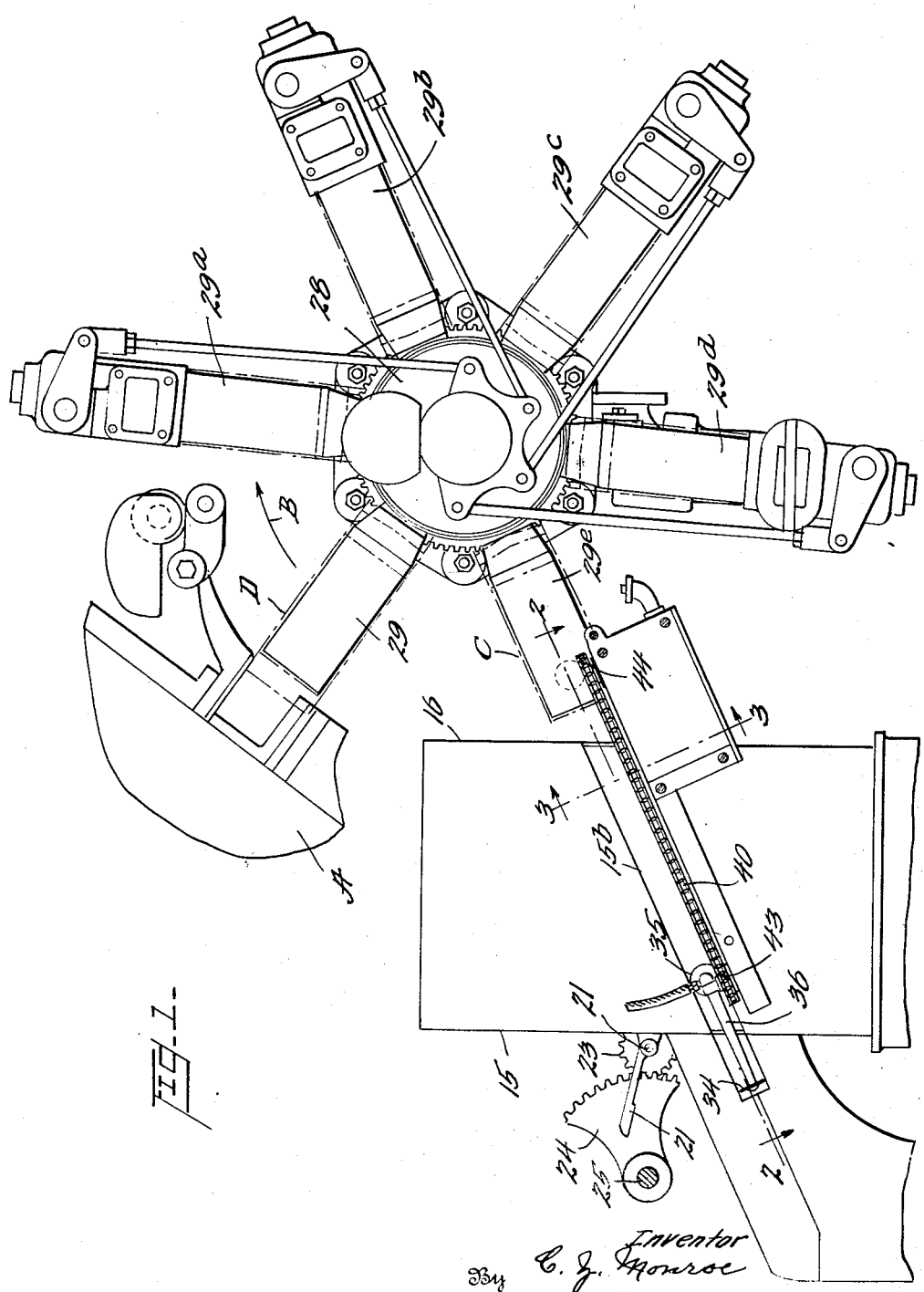

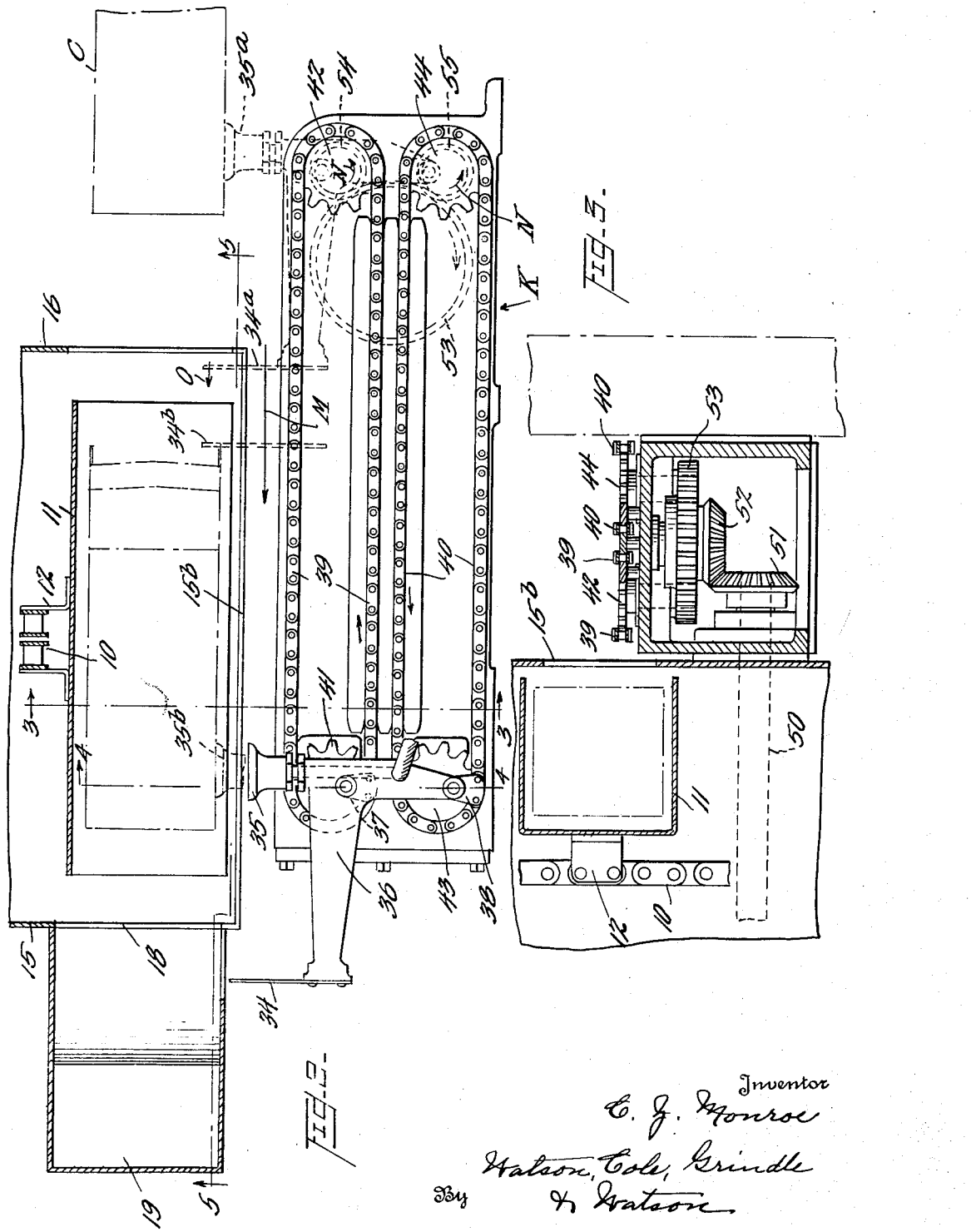

Patented Dec. 12, 1944

2,364,868

UNITED STATES PATENT OFFICE 2,364,868

ARTICLE HANDLING MECHANISM

Charles Z. Monroe, Detroit, Mich., assignor to The American Paper Bottle Company, Toledo, Ohio, a corporation of Ohio Application December 22, 1941, Serial No. 424,039

10 Claims. (Cl. 198—24)

The present invention relates to article handling mechanisms and particularly to mechanisms of this general class which are intended for use in association with container fabricating machines.

Paper containers for liquids such as milk are now widely used and machines for the automatic squaring-out, coating, charging, and sealing of such containers are available. In one form of such mechanism, which has proven to be highly efficient, folded or collapsed blanks are introduced at one point and filled and sealed containers are discharged at a second point, all operations performed between the place of blank introduction and the place of container discharge being accomplished automatically. Various transfer devices are employed for moving the containers through the machine from one operating mechanism to another, including a transfer mechanism for introducing into the coating apparatus containers which have been partially formed, and are ready for coating, and thereafter removing from such coating apparatus the coated and drained containers.

The present invention relates particularly to mechanism of this character and has for its object the provision of means of improved type for successively transferring to a conveyor partially completed paper containers and successively removing therefrom coated containers. The coated containers are removed from the holders or carriers of the conveyor as they reach a predetermined position and into each position just vacated by a coated container is instantly placed an uncoated container, the operations being performed with great rapidity. A coating apparatus of the general type with which the improved article handling mechanism may be most advantageously employed is disclosed and claimed in Patent No. 2,133,214, granted October 11, 1938, to Henry T. Scott, but certain details of the patented coating apparatus have been modified to permit the use, with such apparatus, of the container handling mechanism which comprises the subject matter of the present application. A preferred form of the invention is illustrated in the accompanying drawings in which:

Figure 1 is a side elevation of certain portions only of a machine for fabricating, coating, charging, and sealing paper containers, showing the improved article handling mechanism in position to remove empty partially completed containers from the mandrels upon which they are formed and to place these containers successively on the conveyor of a coating apparatus and thereafter remove the coated containers from such apparatus;

Figure 2 is a section on line 2—2 of Figure 1;
Figure 3 is a section on line 3—3 of Figure 1;
Figure 4 is a section on line 4—4 of Figure 2; and
Figure 5 is a section on line 5—5 of Figure 2.

In Figures 2 and 5 a small portion of the conveyor upon which articles are to be placed and from which articles are to be removed is indicated, this conveyor including a chain 10 and a plurality of article carrying members 11 attached at equal intervals to the chain and movable therewith. Any suitable means for attaching the article carriers to the chain may be employed, such for instance, as the bracket members 12 illustrated in Figure 2. When the article handling mechanism is to be used in association with a coating apparatus of the general type disclosed in the Scott patent referred to, and the articles being handled are empty open-ended paper containers, the carrying members 11 are inclined with respect to the horizontal when the conveyor chain is moving vertically, as shown in Figure 5. Each of these carrying members comprises a box-like structure preferably fabricated of sheet metal with both ends open and unobstructed, the higher open end comprising an aperture for receiving articles and the lower open end comprising an aperture for the discharge of articles. In addition, as indicated clearly in Figures 2 and 3, each carrier member lacks one entire side, i. e., the side remote from that to which the attachment brackets 12 are secured.

The conveyor as thus constructed moves vertically between parallel walls 15 and 16 which walls may serve, if needed, as stops to limit the endwise movement of any article in its carrier, as when the article is entering a liquid bath or emerging therefrom. Normally the articles will rest in the carriers without tendency to move or slip. At one point, however, wall 15 is provided with an aperture indicated at 18 in the drawings and it is through aperture 18 that the containers 17 may pass when they are successively discharged from the article carriers 11. As indicated in Figure 5 the discharged containers enter a chute 19 down which they may fall in succession, being guided by this chute to a further conveyor or mechanism for acting upon the same.

Means is provided for stopping a container which has just been thrust into a carrier 11 so that this container will not continue its movement through aperture 18 into the chute 19, this means including a swinging arm or movable stop member 20 fixed upon a shaft 21 rotatably supported in fixed bearings and which stop member may be moved from container obstructing position, in which position it is illustrated in full lines in Figure 5, to container releasing position, in which position it is illustrated in dotted lines. To secure the desired periodic operation of the stop member in timed synchronism with the movements of the conveyor and other mechanism to be later described, any suitable operating means may be employed. For instance, a pinion 23 may be fixed upon shaft 21, the teeth of this pinion meshing with those of a segment 24 fixed upon shaft 25, rotation of the pinion and shaft 21 being effected by angular movement or oscillation of the segment 24. Any suitable mechanism may be employed to effect the operation of shaft 25 in synchronism with the other elements of the mechanism.

An aperture 26 formed in the casing wall 16 permits introduction of a container or like article into that one of the article carrying members 11 whose discharge aperture is in registry with the port 18 in the wall 15 and the article handling mechanism is so constructed and operated that, whenever an article is discharged from an article carrying member 11, which is at the moment in discharging position, another article may be introduced through the port 26 into such article carrier through its other or upper end.

In Figure 1 of the drawings, portions of a container fabricating mechanism are illustrated. This mechanism includes a hub member 28 with six radiating mandrels 29, 29a, 29b, 29c, 29d, and 29e. On these mandrels the container bottoms are closed and sealed, the mandrel 29 being in position to receive from mechanism diagrammatically indicated at A, a squared-out tubular container. The hub 28 and the several mandrels will rotate, in the operation of the mechanism, intermittently in the direction of the arrow B and as each mandrel passes from the position in which the mandrel 29 is shown, in a clockwise direction around the axis of rotation of the hub 28, the container bottom flaps are closed and secured together by suitable adhesive, a container with its bottom fully formed being indicated at C, on the mandrel 29e, and a container the bottom flaps of which have not been closed being indicated at D, on the mandrel 29. The container C is ready for removal from the mandrel 29e and the mechanism for effecting this removal and placing the container in one of the carriers 11, after having previously ejected a container from that carrier, will now be described.

This means includes a pusher member, a container gripping or feeding member, and means for actuating these members in timed synchronism with the other moving elements of the mechanism. The pusher member is indicated at 34, the container gripping member at 35 and the actuating means for these members generally indicated at K. The pusher 34 comprises a simple finger or plate and the container gripping member 35 comprises a rubber suction cup, both the pusher and the gripper being mounted upon a member 36 with the pusher in advance of the gripper when these elements are moving on their working strokes, or in the direction indicated by the arrow M in Figure 2. Member 36 is pivotally connected at spaced points to two bracket members, one of which is indicated at 37 and the other at 38, bracket member 37 being attached to the endless chain 39 and bracket member 38 to the endless chain 40. Each bracket projects inwardly into the area enclosed by the chain upon which it is mounted so that the path of travel of each pivot is well within such area.

Chain 39 passes around and is supported upon spaced sprockets 41 and 42 and similar sprockets 43 and 44 support and guide chain 40. The axes of sprockets 41 and 42 are equidistantly spaced from and are parallel to the axes of the sprockets 43 and 44, respectively, and the chains 39 and 40 are of equal length so that each chain is disposed to have two elongated parallel reaches the adjacent ends of which are connected by semi-circular portions. With an arrangement such as that described, and assuming that the sprockets are rotated at identical angular velocities and in the same direction, indicated by the arrows N in Figure 2, the member 36 will be moved in a closed path and will be, in any one position along its path of travel, parallel to each of its former and subsequent positions. In other words, member 36 will not move angularly with respect to a line through its points of pivotal connection to brackets 37 and 38.

During the operation of the mechanism described, and assuming that the drive sprockets 42 and 44 are rotated in the same direction and at equal angular velocities, the pusher member 34 will be moved in the direction of the arrow O from the position in which it is indicated in dotted lines (34a) in Figure 2, to a position (34b) where it will first contact the end of a container disposed within a container carrying member 11. As the pusher member continues its movement from right to left (Figure 2) it must necessarily force the container before it, pushing the container into the chute 19, the stop member 20 having been lifted to permit this movement.

At the time that the pusher member 34 reaches the position 34a the suction gripper 35 reaches the position 35a, where it engages the side wall of a container which has had its bottom completely formed and is at the time supported loosely upon mandrel 29e and is ready for removal. At about the instant of contact, or near contact, of the suction gripper 35 with the container wall a sub-atmospheric pressure is established within the gripper so that the container wall is securely gripped. The means for controlling the pressure within the gripper forms no part of the present invention and may be any one of a number of suitable mechanisms now provided for this purpose. It should be stated, however, that the suction is maintained during the entire working stroke of the gripper 35 and is only released at about the time when the gripper reaches the position indicated at 35b, or just before it begins to move away from the article carrier 11.

As a result of this any container which is engaged or gripped by the suction gripper when it reaches its position 35a will be carried forward into that carrier member 11 which is, at the moment, in position to receive it, and is released when properly positioned in such carrier. The stop 20 must, of course, be lifted before the container is engaged by the pusher and be returned to operative position in time to perform its intended functions. The side wall of the casing is, of course, slotted, as at 15b to permit the pusher and gripper to follow the paths which they must necessarily follow in performing the operations described. The sprockets 42 and 44 may be driven by any suitable means as, for instance, from a shaft 50, through intermeshing bevel gears 51 and 52 and a large gear 53, the teeth of which are in mesh with pinions 54 and 55 mounted upon short shafts to the upper ends of which, respectively, the sprockets 42 and 44 are secured. Sprockets 41 and 43 are idler sprockets and may be supported in the manner indicated in Figure 4, on the upper ends of spindles 56 which are in turn supported in anti-friction bearings 57 mounted in the frame.

It will be understood that the several movable parts of the mechanism described will be actuated in synchronism with each other so that the unloading and loading of an article carrier 11 will be effected at the desired instant. The details of such mechanism comprise no part of the present invention, and may be entirely conventional.

Having thus described the invention, what is claimed as new and desired to be secured by Letters Patent is:

1. Article handling apparatus comprising a conveyor having article transporting members each of which has aligned article receiving and article discharge apertures, an article pusher, an article feeder, and means for actuating said pusher and feeder in synchronism with the movements of the conveyor, whereby the pusher is moved to engage and eject an article from one of said members and the feeder is immediately thereafter caused to place another such article within the said member.

2. The combination set forth in claim 1 in which the said actuating means moves the pusher and feeder in endless paths, the pusher preceding the feeder when the pusher and feeder are on their working strokes, respectively.

3. The combination set forth in claim 1 in which the said actuating means moves the pusher, when on its working stroke, in a rectilinear path which passes through the article transporting member and the feeder is simultaneously moved along a path parallel to said first mentioned path.

4. Article handling apparatus as described in claim 1 in which the said article transporting members have longitudinally extending openings and the pusher passes through one such opening upon each of its working strokes.

5. The combination with a conveyor having a plurality of article receiving members mounted thereon, of means for feeding an article into each of said members as such member reaches a predetermined charging and discharging position, and a device associated and movable simultaneously with said article feeding means for positively engaging and ejecting any article which may be within a member reaching such predetermined charging and discharging position, prior to the insertion of another article.

6. The combination with a conveyor having a plurality of article receiving members mounted thereon, of means for feeding an article into each of said members as such member reaches a predetermined charging and discharging position, and a device associated and movable simultaneously with said article feeding means for ejecting any article which may be within a member reaching such predetermined position, prior to the insertion of another article, said device comprising a pusher member rigidly secured to, and projecting in advance of, said article feeding means.

7. Article handling apparatus comprising a conveyor chain having a series of article holders mounted thereon, and a mechanism for dislodging an article from one of said holders and immediately thereafter placing another article in the same holder, said mechanism including a member movable transversely of the chain and having an article pushing portion and an article gripping portion.

8. The article handling apparatus described in claim 7, in which means in addition to said conveyor and said member prevents release of articles from said article holders except when said mechanism is acting.

9. The article handling apparatus described in claim 7 in which said article holders have opposed article receiving and discharge ports and in which means independent of the conveyor is provided for maintaining the discharge port of each article holder closed except when said mechanism is active.

10. The combination set forth in claim 7 in which said movable member is pivotally connected at spaced points to a plurality of endless chains to be moved by said chains through a closed path having separate working and return portions.

CHARLES Z. MONROE.